Nov. 6, 1945. C. DE LANGE ET AL 2,388,532
BLOCKING LAYER CELL
Filed May 29, 1941 3 Sheets-Sheet 1

Inventors:
C. DE LANGE &
C. L. BOUCHER
By *E. T. Wunderoth*
Attorney

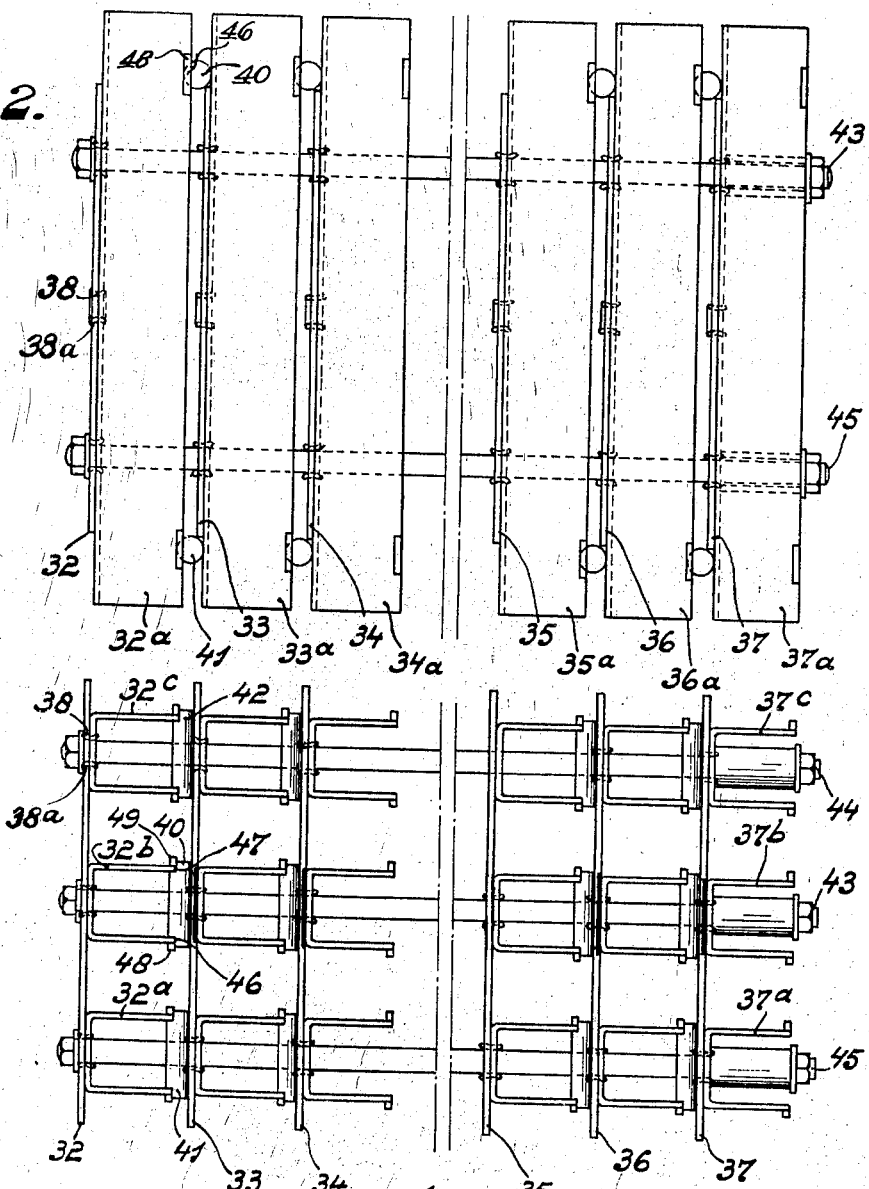

Nov. 6, 1945.  C. DE LANGE ET AL  2,388,532
BLOCKING LAYER CELL
Filed May 29, 1941  3 Sheets-Sheet 3

Inventors:
C. DE LANGE +
C. L. BOUCHER
By E. F. Wendroth
Attorney

Patented Nov. 6, 1945

2,388,532

UNITED STATES PATENT OFFICE 2,388,532

BLOCKING LAYER CELL

Cornelis de Lange and Charles Louis Boucher, Eindhoven, Netherlands; vested in the Alien Property Custodian Application May 29, 1941, Serial No. 395,875
In the Netherlands June 29, 1940

5 Claims. (Cl. 175—366)

This invention relates to a blocking-layer cell comprising one or more cooling plates and has for its purpose to obtain a more effective cooling than it was hitherto possible.

According to the invention this is achieved by providing that by means of a rigid connection each cooling plate is drawn at several points against the surface to be cooled. In known constructions, such as commonly used in blocking-layer rectifiers, the transmission of heat between the cooling plate and the blocking-layer cell (rectifier plate) generally takes place by means of a drawbolt which extends through the plate and the cell and by which these parts, if desired with the interposition of an intermediate member for transmitting the heat, are drawn against each other. As an alternative the contact between the cooling plate and the rectifier plate may be made by a compression member provided on the exterior of the rectifier plate. The use of a separate thermal-contact member between the cooling plate and the rectifier plate involves the drawback that the heat to be dissipated must pass to the cooling plate from the rectifier surface through this thermal-contact member and be conducted again from the contact point to the radiating ends of the cooling plate. When the cooling plate directly engages the supporting plate or an electrode of the rectifier it is difficult to ensure sufficient engagement for the transmission of heat throughout the surface.

According to the present invention there is provided a rigid connection between the cooling plate and the rectifier plate at several points of the surface, so that a suitable transmission of heat is assured at all of these points, and the heat need no longer be conveyed first to a central point and then carried off again. The junction points are preferably evenly distributed over the surface of the blocking-layer cell. Since the connections are rigid we obtain not only a suitable transmission of heat but also the advantage that the cells may be assembled by simple means into small volume units. In fact, in a form of construction the cooling plates are used as a supporting element for assembling the cells into a unit, these cooling plates being maintained in the required spaced relation by connecting elements such as supporting beams.

The foregoing and further aspects of the invention will be more fully explained hereinafter by reference to the accompanying drawings.

Figures 1a and b are a plan view and a front view respectively of one form of construction in accordance with the invention.

Figures 2, 3 and 4 are a side view, a plan view and a front view respectively of another form of construction by reference to which several executional examples of details, which may be used with advantage, will also be explained.

Figure 1A:
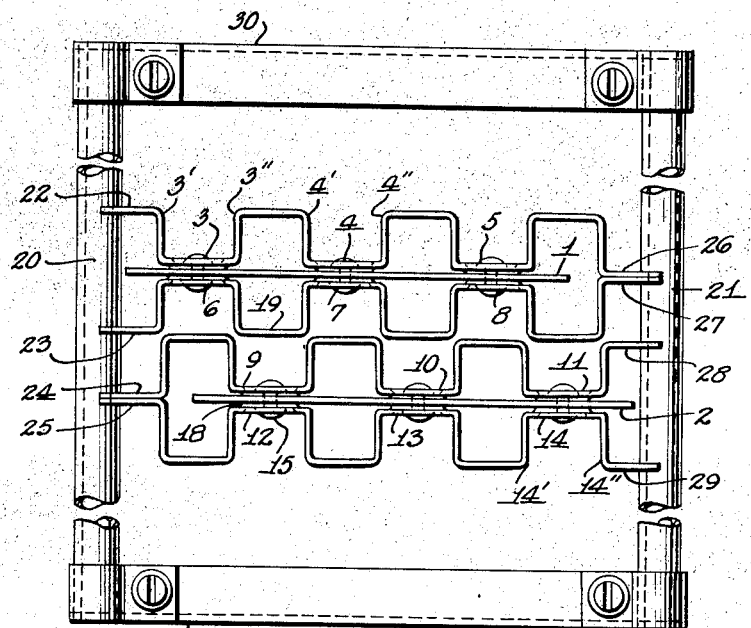

In Fig. 1 two so-called rectifier plates are designated 1 and 2. The term rectifier plate is to be understood to mean a supporting plate on which are provided the various electrodes of the rectifier. Since in this specification the structure of the blocking-layer rectifier is not of primary concern, only the said supporting plate is represented which may consist of iron. In Fig. 1 a rectifier layer is assumed to be provided on either side of the said supporting plate, the electrodes of this rectifier consisting of a layer of selenium bearing on the supporting plate and of a counter-electrode provided on this selenium electrode, which counter-electrode consists of an alloy of tin, bismuth and cadmium melting at about 100°. Between these two electrodes is provided a blocking layer. Instead of a selenium rectifier a copper oxide rectifier or another type of blocking-layer rectifier may be assumed to lie on either side of the supporting plate.

The metal strips 3 to 14 constitute the cooling plates which are furnished with wings 3', 3" to 14', 14" so that each cooling plate is U-shaped, the wings 3' 3" and so on constituting the limbs of the U. In the form of construction represented these wings are interconnected so that the whole forms a corrugated plate. For the principle of the invention it is essential, however, that each part 3 to 14, as shown in Fig. 1b, is drawn against the cooled surface by rigid connections at several points. To this end the plate 12 is furnished with three apertures 15, 16 and 17 which are evenly distributed over the height of the rectifier plate 2 and register with apertures provided in the said rectifier plate. Through each aperture is provided a riveted joint. Since this also applies to the plate parts 13 and 14 a uniform distribution of the junction points is obtained over the surface of the blocking-layer cell, so that the heat is very swiftly carried off at all parts of the surface. It is obvious that instead of the rectifier plates 1 and 2 having the size shown in the drawing it is also possible to make use of plates having, for instance, the same height and corresponding to one third of the width, the cooling being effected by means of U-beams whose limbs, in contradistinction to Fig. 1a, are not united to form a corrugated plate.

Figure 1B:
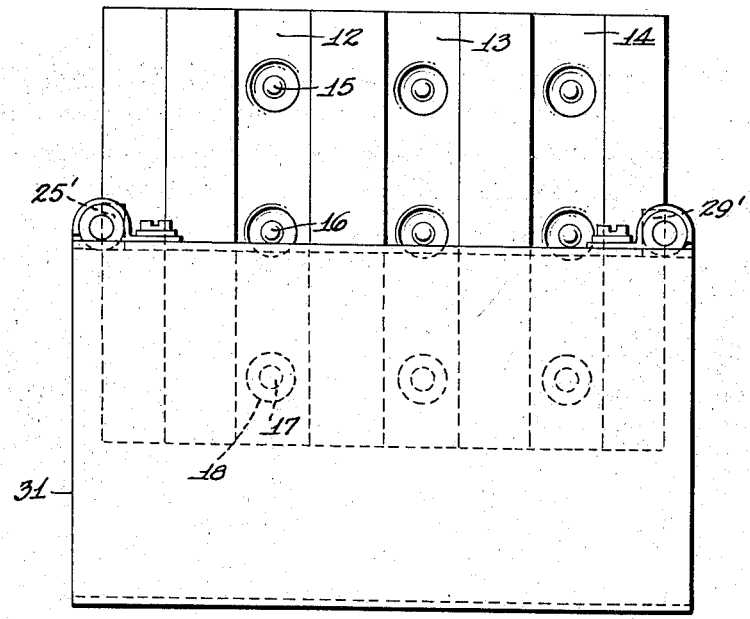

Furthermore it appears from the Figures 1a and 1b that each rectifier plate is provided on either side with U-shaped cooling parts, since each plate carries two rectifiers each of which must be cooled. By the rivets, one of which is represented at 15, the cooling parts are at the same time united mutually and with the rectifier plate. The cooling plates 3 to 14 each carry at each connecting point a sunk annular part. One of these is denoted by the numeral 18 in Figures 1a and b. These annular parts are obtained by pressing out the plate at this point. They provide for a suitable thermal contact at the joints. If desired, these annular parts are for this purpose milled or ground at the front side. This principle to limit the transmission of heat to a small well engaging surface by means of a flat ring is described in U. S. Patent No. 2,302,087, issued November 17, 1942.

As appears from the plan view of Fig. 1a the rectifier plates 1 and 2 are skewed with respect to one another in such manner that in each instance a cooling plate, for instance 9 of the rectifier plate 2, lies opposite a connecting part, for instance 19, between two U-shaped cooling plates 6 and 7 of the rectifier plate 1. In this way a more uniform transmission of heat is ensured between the cooling plates of the juxtaposed rectifier plates.

In this case the cooling plates are at the same time used as a carrier element for the assemblage of a plurality of rectifier cells into a unit, in which the cooling plates are maintained and conveniently spaced from each other by connecting elements constituted by the supporting beams 20 and 21. To this end the side pieces 22 to 29 of the corrugated plates, constituted by the interconnected U-beams are provided with incisions (25' and 29' in Fig. 1b) which engage corresponding incisions of the supporting beams 20 and 21.

The latter consist of hollow tubes of insulating material, such as paper layers soaked in synthetic resin, and are supported in their turn by the walls 30 and 31 of a frame.

Since the corrugated plates formed by the U-beams are arranged so as to be insulated from each other they may have fixed to them the supply conductors for the counter-electrodes of the rectifying cells, whereas the supply conductors for the selenium electrodes may be connected to the supporting plates 1 and 2.

It will be clear from the assembly that the rectifier plates together with the U-beams rigidly secured thereto constitute such firm constructional parts, exactly owing to the last-mentioned rigid connections, as to permit the assemblage referred to above, in which the cooling plates act as supporting elements.

Figure 4:
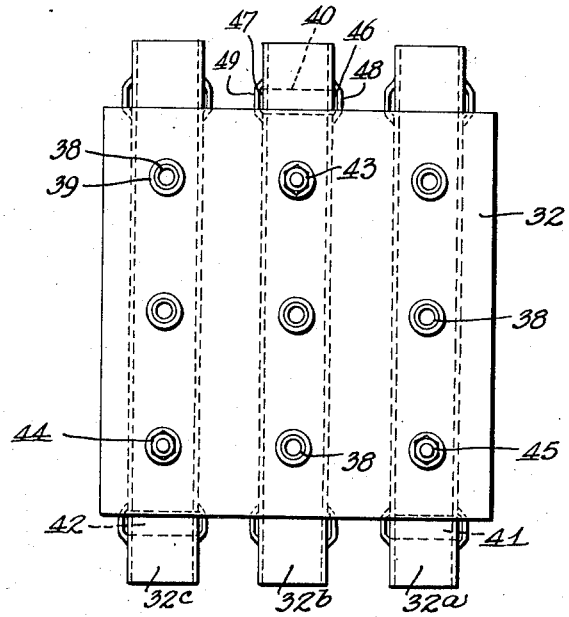

These advantages are also realized in the construction shown in Figures 2 to 4.

In these figures the rectifier plates are provided with a rectifier only at one side and more particularly at the side remote from the cooling U-beams. The electrode layers of the rectifier are not represented, since representation of the supporting plates 32 to 37 is sufficient for making the invention well understood. The cooling beams associated with the rectifier plate 32, which beams have a U-shaped cross-section, are designated 32a, 32b and 32c and so on for the succeeding rectifier plates. A smooth finishing of the U-beams and the supporting plate ensures a suitable transmission of heat and annular intermediate pieces for transmitting the heat are omitted. Each U-beam has three junction points where the cooling plate and the blocking-layer cell are perforated, the aperture, as shown at 38a, being engaged by a bush 38 flanged on either side. To prevent this bush from establishing an electrical contact between the supporting plate 32 and the counter-electrode, the counter-electrode is applied by spraying and the region around the bush is masked by means of a templet. This is indicated in Fig. 4 by circles around the junction points, one of which is designated 39 at the bush 38.

Figure 5A:
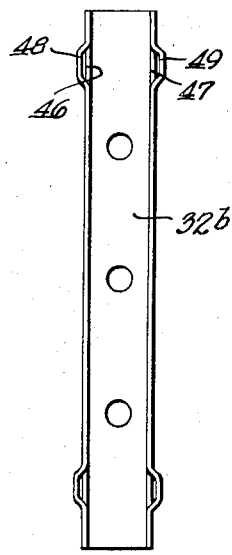
Fig. 5 represents a suitable form of construction of a cooling plate.
Figure 5B:
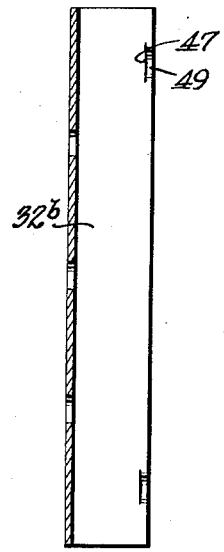
Figure 5C:
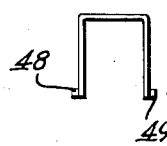

As appears more particularly from Figures 2 and 4 the U-beams extend beyond the rectifier plates, insulating rods being provided at these projecting ends between the U-beams of succeeding plates. The rods provided between the rectifier plates 32 and 33 are designated 40, 41 and 42. In this way a three-point support is obtained between the U-beams of one rectifier plate (32a, b and c) and the next rectifier plate. In this manner a stack-element is created and a rectifying unit having the desired power can be obtained by stacking the required number of rectifier plates. By means of three ties 43, 44 and 45 the assembly can be compressed. Thus extremely effective cooling is combined with a very simple structure. Since the rectifier plates and the parallel U-beams provided on each rectifier plate are rigidly secured to each other, the cooling plates can be used as supporting elements for the assemblage. Furthermore, it is no longer necessary to make a diversified stock of complete rectifiers of different power ratings, since the constructional parts of the rectifiers are so simple and few that only rectifier plates having U-beams and glass rods secured thereto need be kept in stock; to make a rectifier assembly of any desired power rating the required number of plates may be stacked and ties of corresponding length may be provided. The principle can be maintained when reducing the rectifier plates to two-thirds or one-third of their width for making assemblies of smaller power differential, two or one U-beam being then used respectively for cooling each rectifier plate. In this case the position of the glass rods must be chosen accordingly, but this can be readily achieved by giving all U-beams a uniform shape for example as shown in the form of construction represented (see also Fig. 5). In fact, the insulating rods, for instance rods 40, which are used as spacers, are so constructed as to be slightly longer than the distance between the limbs of the U-shaped beams and engage incisions 46 and 47 of these limbs, the material being pressed outwards from these incisions and embracing in the form of strips 48, 49, the ends of the insulating rods.

Furthermore, it appears from the drawing that the apertures in the flanged bushes may be used for the passage of ties 43, 44 and 45.

The insulating rods constituting the spacers may consists of very cheap glass rods. Instead of flanged bushes it is also possible to use other means for obtaining a rigid connection between the cooling plate and the rectifier plate. For example, upon stamping the apertures in the cooling plates a flanged edge may be formed at the same time, which is subsequently passed through the corresponding aperture of the rectifier plate and bent over.

What we claim is:

1. A blocking-layer rectifier assembly comprising a plurality of rectifier units, each of said units comprising a rectifier cell having a large surface, a cooling plate member having a plurality of surface portions in contact with said large surface at interspaced points, and a plurality of members each rigidly securing the cooling plate to said rectifier cell at one of said interspaced points, said units being spaced from each other by a supporting beam engaging the cooling plates thereof.

2. A blocking-layer rectifier assembly comprising a plurality of superposed spaced rectifier units, each of said units comprising a rectifier cell having a large surface, a cooling plate member comprising a plurality of substantially parallel positioned U-shaped beams in contact with said large surface at interspaced points, a plurality of members rigidly securing each of said beams to said rectifier cell at a plurality of interspaced points, a plurality of bolt members common to the said superposed rectifier units and securing the beams thereof to the cells thereof at a plurality of other interspaced points, and insulating rods interposed between adjacently disposed portions of the U-beams of adjacently positioned rectifier cells.

3. A blocking-layer rectifier assembly comprising a plurality of superposed spaced rectifier units, each of said units comprising a rectifier cell having a large surface, a cooling plate member comprising a plurality of substantially parallel positioned U-shaped beams in contact with said large surface at interspaced points, a plurality of members rigidly securing each of said beams to said rectifier cell at a plurality of interspaced points, a plurality of bolt members common to the said superposed rectifier units and securing the beams thereof to the cells thereof at a plurality of other interspaced points, and insulating rods interposed between the limbs of the U-shaped beams of one cell and the adjacently disposed portions of the U-shaped beams of the adjacently positioned cell, said rods being longer than the space between said limbs, and said limbs embracing the ends of said rods.

4. A blocking-layer rectifier assembly comprising a rectifier cell having a large surface, a cooling plate having a plurality of surface portions in contact with the said large surface at interspaced points, a plurality of members each rigidly securing the cooling plate to said rectifier cell at one of said interspaced points, a frame member having opposing wall portions arranged at opposite sides of said rectifier cell, and supporting beam members interposed between said wall portions and having their end portions secured thereto, said cooling plate being fixedly secured to said beam members and positioning said rectifier cell between said wall portions.

5. A blocking-layer rectifier assembly comprising a plurality of rectifier units arranged in superposed spaced relationship, each of said units comprising a rectifier cell having a large surface, two cooling plate members arranged on opposite sides of the rectifier cell and contacting opposite sides of the rectifier cell at a plurality of interspaced points and each comprising a plurality of substantially parallel positioned U-shaped beams having their wing portions interconnected, and a plurality of members rigidly securing each of said beams to the rectifier cell at one of said interspaced points, a frame member having spaced opposing portions arranged on opposite sides of the superposed cells and supporting beam members interposed between said spaced portions and having their ends secured thereto, the cooling plates of each of said cells being fixedly secured to said beam members and being arranged in skew relationship with respect to the cooling plates of the adjacently positioned rectifier cell.

CORNELIS de LANGE.
CHARLES LOUIS BOUCHER.